United States Patent [19]

Matsuoka et al.

[11] Patent Number: 5,339,243
[45] Date of Patent: Aug. 16, 1994

[54] POWER STEERING APPARATUS

[75] Inventors: Hirofumi Matsuoka, Souraku; Hidetoshi Tabuse, Ikoma, both of Japan

[73] Assignee: Koyo Seiko Co., Ltd., Osaka, Japan

[21] Appl. No.: 935,596

[22] Filed: Aug. 26, 1992

[30] Foreign Application Priority Data

Sep. 13, 1991 [JP] Japan .................. 3-082516[U]

[51] Int. Cl.$^5$ ............................................. B62D 5/04
[52] U.S. Cl. .................... 364/424.05; 364/424.01; 180/79.1
[58] Field of Search ................. 364/424.05, 424.01; 180/79.1

[56] References Cited

U.S. PATENT DOCUMENTS

| | | | |
|---|---|---|---|
| 4,830,137 | 5/1989 | Tatemoto et al. | 180/79.1 |
| 4,926,955 | 5/1990 | Ohmura et al. | 180/140 |
| 5,014,801 | 5/1991 | Hirose | 180/140 |
| 5,052,508 | 10/1991 | Soejima | 180/234 |
| 5,202,830 | 4/1993 | Tsurumiya et al. | 364/424.05 |

FOREIGN PATENT DOCUMENTS

0273387 7/1988 European Pat. Off.

Primary Examiner—Thomas G. Black
Assistant Examiner—Julie D. Day
Attorney, Agent, or Firm—Darby & Darby

[57] ABSTRACT

A power steering apparatus having a torque sensor for detecting steering force, an actuator for assisting the steering force according to the torque detected by the torque sensor, two vehicle speed sensors for detecting vehicle speed, and a microcomputer for controlling the actuator according to the detection results by the vehicle speed sensors. When the difference between the vehicle speed values detected by the two vehicle speed sensors becomes greater than a predetermined value, the greater vehicle speed value of the two is integrated to obtain a control vehicle speed value for control of the actuator. When the vehicle speed value difference is greater than the predetermined value and remains in that state for more than a predetermined duration of time, either a predetermined vehicle speed value is set as the control vehicle speed value or the operation of the actuator is disabled.

6 Claims, 6 Drawing Sheets

POWER STEERING APPARATUS

BACKGROUND OF THE INVENTION

1. Field of the Invention

The present invention relates to a power steering apparatus which uses an actuator to provide power to assist the steering force for a vehicle.

2. Description of the Related Art

Electric power steering apparatus have come into use for vehicles, wherein the steering apparatus uses, for example, an electric motor as an actuator to provide power to assist the driver's steering effort. In such electric power steering apparatus, the steering force is detected by a torque sensor and the electric motor is operated according to the torque detected by the torque sensor.

Also, the vehicle's speed is detected by a vehicle speed sensor, and control is performed so that when the detected speed is higher than a predetermined value, the operation of the electric motor is disabled, according to the torque detected by the torque sensor, to cut off the power assistance at high travelling speed, thereby enhancing the steering safety.

However, if the vehicle speed sensor fails, there arises a possibility that the electric motor to be operated according to the detected torque may not be disabled as intended; to avoid such a problem, a second vehicle speed sensor for fail-safe use is provided so that in case of failure of the first vehicle speed sensor, the electric motor can be disabled on the basis of the speed detected by the second vehicle speed sensor. When such a second vehicle speed sensor is provided for fail-safe use, the operation of the electric motor is usually disabled on the basis of the larger speed value of the two detected by the two vehicle speed sensors.

In a configuration in which the failure of the vehicle speed sensor is detected by monitoring the sensor-detected vehicle speed value over a short duration of time, if chattering occurs in the detected vehicle speed value, there is a possibility of erroneously detecting the vehicle speed, and once the erroneous vehicle speed value has been detected, the electric motor designed to provide power to assist the steering force will remain held in a disabled state even after the termination of the erroneous detection, thus decreasing the utilization rate of the electric motor. On the other hand, in a configuration in which the failure of vehicle speed sensor is detected by monitoring the detected speed values over a longer duration of time, there is a possibility that the electric motor may not be disabled until the sensor failure is detected, thus lowering the steering safety during high speed travelling.

SUMMARY OF THE INVENTION

It is an object of the present invention to provide a power steering apparatus that is capable of controlling the operation of an actuator (an electric motor) without decreasing the utilization rate of the actuator that provides power to assist the steering force.

It is another object of the present invention to provide a power steering apparatus that better ensures the steering safety during high speed travelling.

The power steering apparatus of the present invention has a torque sensor for detecting steering force, an actuator for assisting the steering force according to the torque detected by the torque sensor, two vehicle speed sensors for detecting speed values, and control means for controlling the operation of the actuator on the basis of the vehicle speed values detected by the vehicle speed sensors, wherein when the difference between the vehicle speed values detected by the two vehicle speed sensors is greater than a predetermined value, the larger value of the two is integrated to decide a control vehicle speed value for controlling the operation of the actuator.

According to the invention, when the vehicle speed difference is greater than the predetermined value and remains in that state for more than a predetermined duration of time, either a predetermined vehicle speed value is set as the control vehicle speed value or the operation of the actuator is disabled. The control vehicle speed value is varied on the basis of the predetermined vehicle speed value and a predetermined time constant. Furthermore, when the vehicle speed difference becomes smaller than a first predetermined value within the predetermined duration of time and when the difference between the control vehicle speed value and one or other of the detected vehicle speed values becomes smaller than a second predetermined value smaller than the first predetermined value, one or other of the detected vehicle speed values is set as the control vehicle speed value.

Thus, in the power steering apparatus of the present invention, even if there occurs an abrupt change in the sensor-detected vehicle speed value, there is no abrupt change of the actuator assisting the steering force and no drop of the utilization rate thereof. Furthermore, the steering safety during high speed travelling is enhanced.

The above and further objects and features of the invention will more fully be apparent from the following detailed description with accompanying drawings.

DESCRIPTION OF THE PREFERRED EMBODIMENTS

The present invention will now be described in detail by way of example and with reference to the accompanying drawings.

Figure 1:
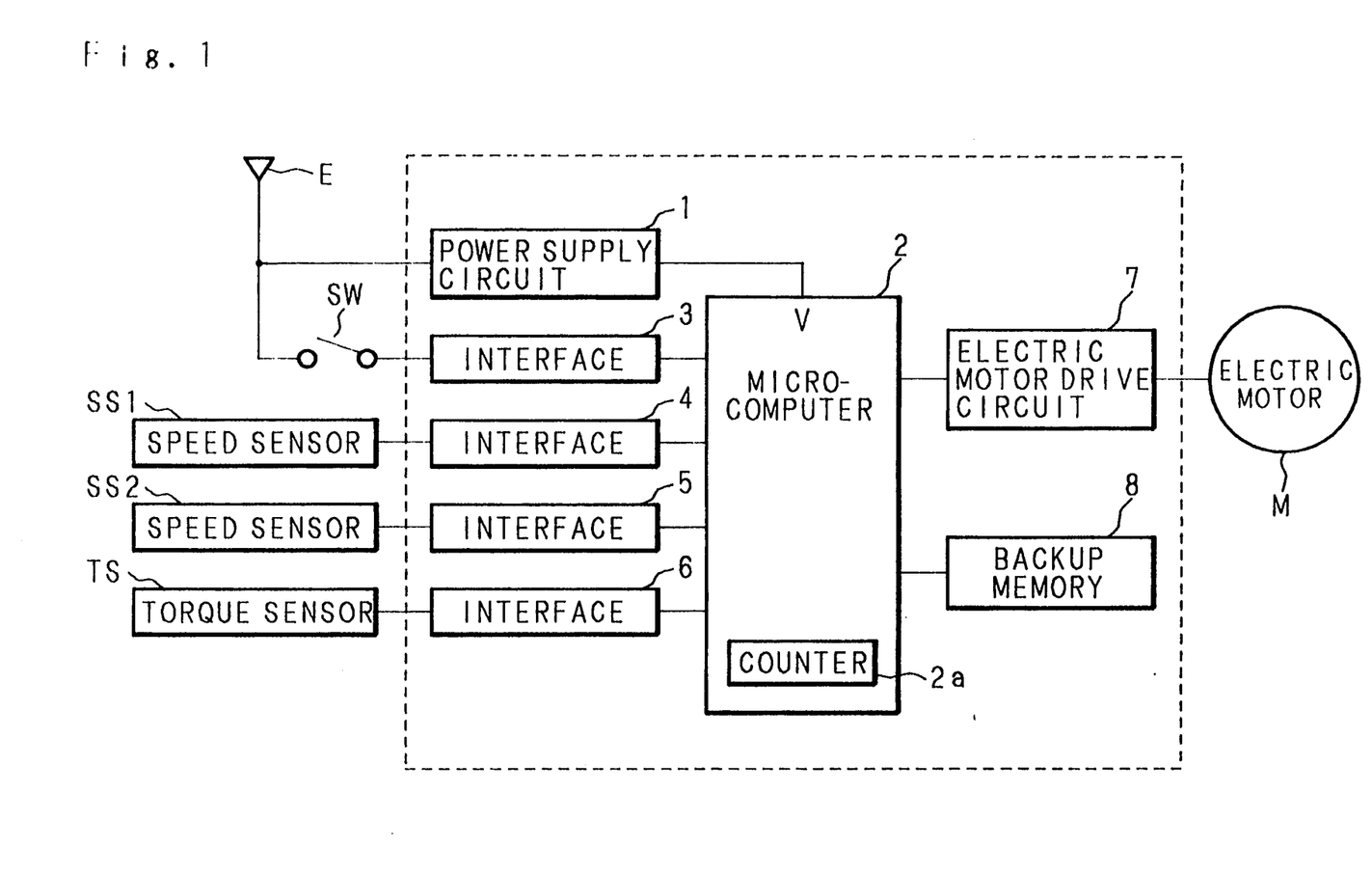
FIG. 1 is a block diagram illustrating the configuration of a power steering apparatus according to the present invention.

FIG. 1 is a block diagram illustrating the configuration of a power steering apparatus according to the present invention. A voltage from a DC power supply E is supplied through a power supply circuit 1 to a power terminal V of a microcomputer 2 containing a counter 2a and a timer (not shown). The voltage from the DC power supply E is also supplied to the microcomputer 2 through a switch SW interlocked with an engine ignition switch and through an interface 3.

A first vehicle speed sensor SS1 and a second vehicle speed sensor SS2 are provided to detect the vehicle speed, and their detected speed values are fed to the microcomputer 2 through respective interfaces 4 and 5. A torque sensor TS detects the steering force, and the detected torque is inputted to the microcomputer 2 through an interface 6. The microcomputer 2 outputs an electric motor drive signal, which is inputted to an electric motor drive circuit 7. The electric motor drive circuit 7 outputs a driving power to drive an electric motor M which provides power to assist the steering force. A failure determination flag is stored in a backup memory 8, the flag being set when the microcomputer 2 has determined a vehicle speed sensor failure state, as will be described later.

Figure 2:
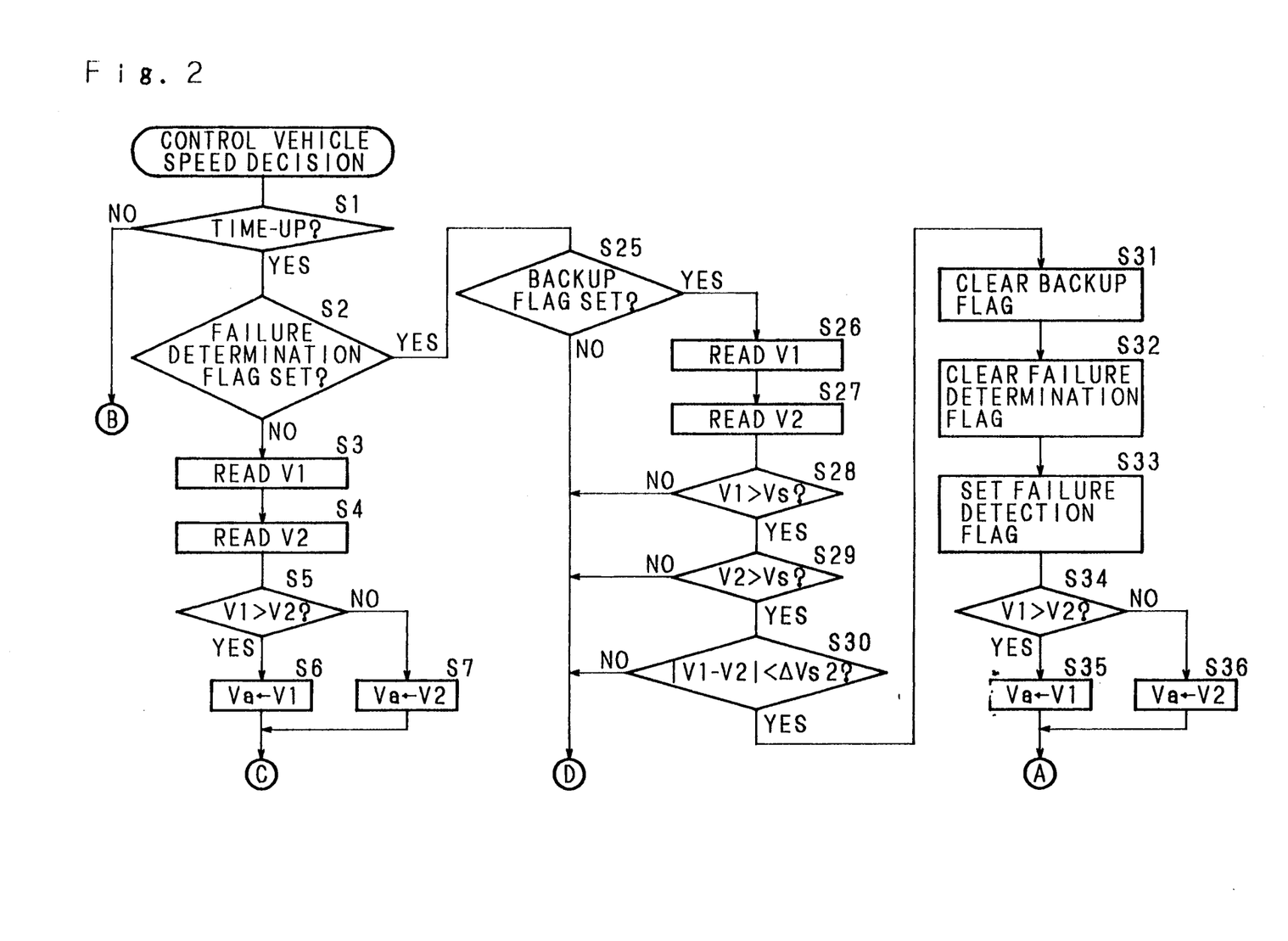
FIGS. 2 and 3 are a flowchart illustrating the steps of a routine for deciding a control vehicle speed value by a microcomputer.
Figure 3:
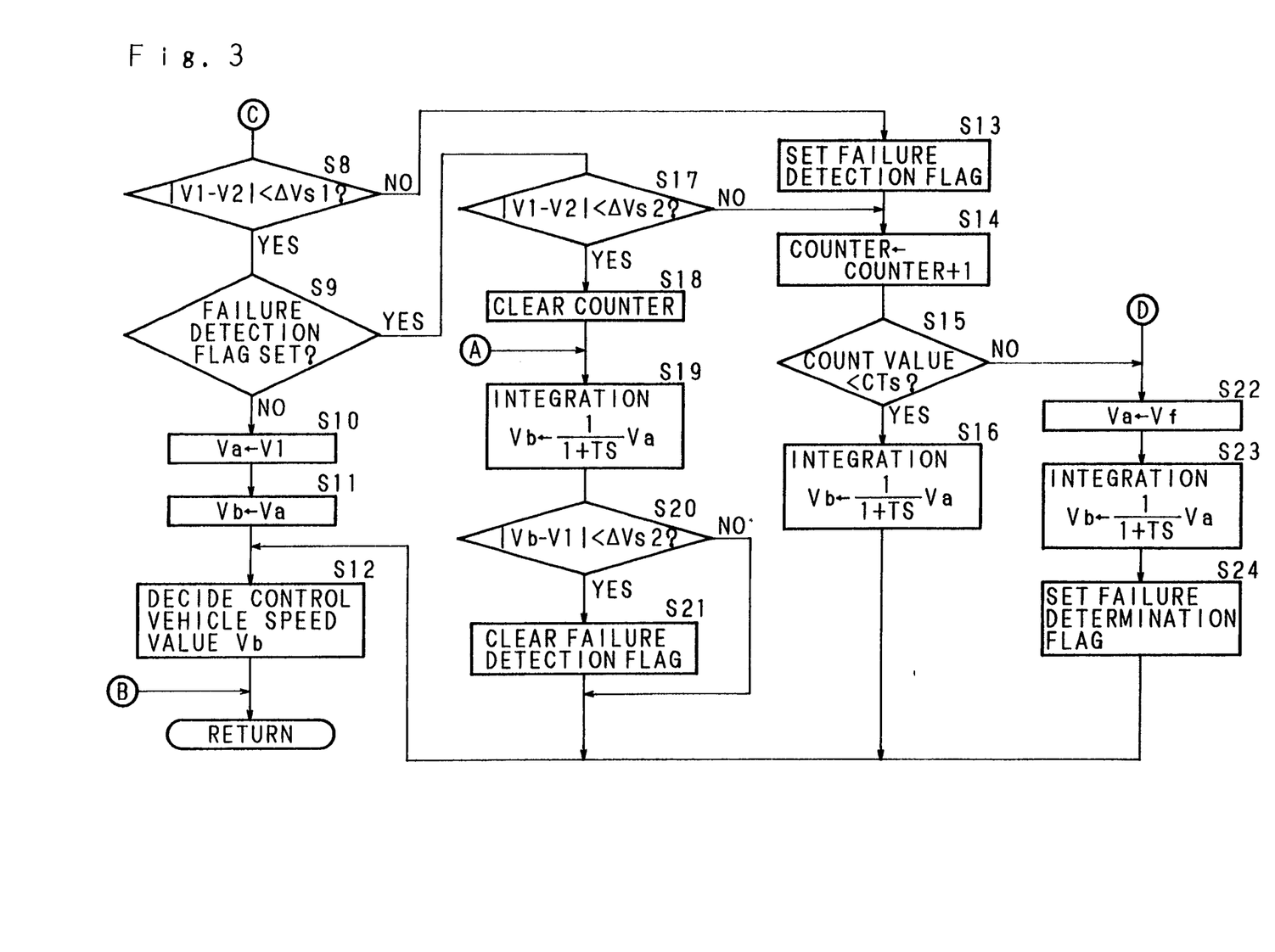

The operation of the thus configured power steering apparatus will now be described with reference to the flowcharts of FIGS. 2, 3, and 4, which illustrate the control steps of the microcomputer 2, and to FIGS. 5 and 6, which show the relationships of the vehicle speed values, detected by the first and second vehicle speed sensors SS1 and SS2, relative to the control vehicle speed values.

The microcomputer 2 waits until the time set on the timer (not shown) is up, and when the timeup situation has occurred (S1: YES), the failure determination flag is tested to see if the flag is set to determine a failure state (S2).

When the failure determination flag is not set (S2: NO), a vehicle speed value V1, detected by the first vehicle speed sensor SS1, is read first (S3), and then a vehicle speed value V2, detected by the second vehicle speed sensor SS2, is read (S4). A comparison is made between the vehicle speed values V1 and V2 (S5); if the vehicle speed value V1 is the larger of the two (S5: YES), the vehicle speed value V1 is selected as a vehicle speed detection value Va (S6), and if the vehicle speed value V2 is the larger of the two (S5: NO), then the vehicle speed value V2 is selected as the vehicle speed detection value Va (S7).

Next, a vehicle speed value difference $|V1-V2|$, the difference between the vehicle speed values V1 and V2, is compared with a first predetermined vehicle speed set value $\Delta Vs1$ (S8); if the difference is smaller than the first vehicle speed set value $\Delta Vs1$ (S8: YES), then a failure detection flag is tested to see if the flag is set indicating an occurrence of failure in the vehicle speed sensor SS1 or SS2 (S9). When the flag is not set (S9: NO), the vehicle speed value V1 is again selected as the vehicle speed detection value Va (S10), and the thus determined vehicle speed detection value Va is set as a control vehicle speed value Vb (S11), thus deciding the control vehicle speed value Vb for controlling the operation of the electric motor M (S12).

When the vehicle speed sensors SS1 and SS2 are both operating properly, the vehicle speed value V1 detected by the first vehicle speed sensor SS1 is selected as the vehicle speed detection value Va. As a result, during period T1 in which the difference between the vehicle speed values V1 and V2 of the vehicle speed sensors SS1 and SS2 is within the predetermined value ($\Delta Vs1$), as shown in FIG. 5, the vehicle speed value V1 of the first vehicle speed sensor SS1 is selected as the control vehicle speed value Vb for controlling the operation of the electric motor M.

Figure 5:
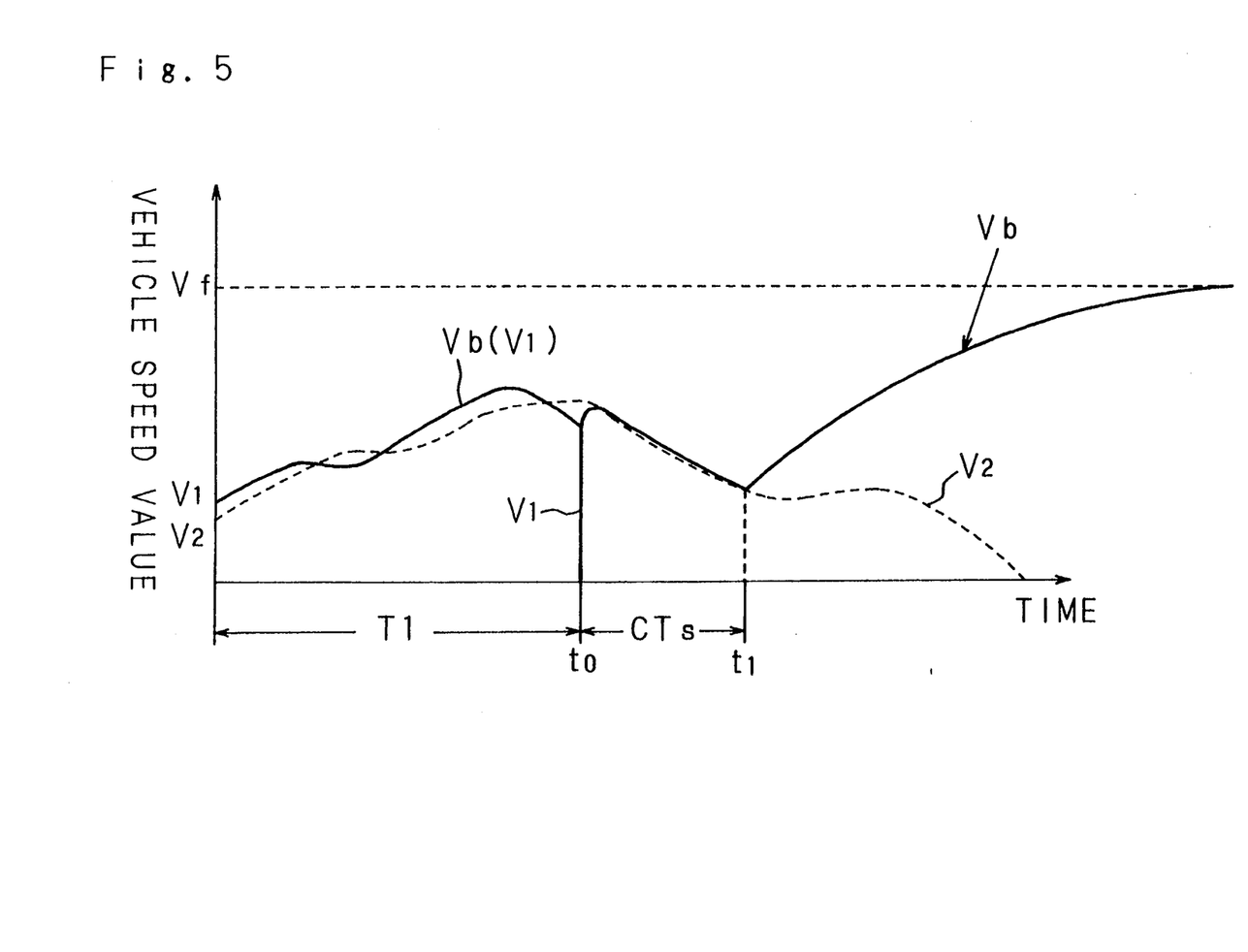
FIG. 5 is a graph showing the relationship between sensor output and control vehicle speed value when a vehicle speed sensor failure has occurred.

On the other hand, if the first vehicle speed sensor SS1 fails at time t0 in FIG. 5, due to a wire breakage, for example, the difference between the vehicle speed value V1 of the first vehicle speed sensor SS1 and the vehicle speed value V2 of the second vehicle speed sensor SS2 will increase. As a result, when the microcomputer 2 compares the vehicle speed value difference $|V1-V2|$ with the first vehicle speed set value $\Delta Vs1$, it is decided that the difference is greater than the first vehicle speed set value $\Delta Vs1$ (S8: NO), and therefore, the failure detection flag is set (S13).

Then, the counter 2a is incremented (S14), and a decision is made as to whether the count value of the counter 2a is smaller than a failure determination value CTs, a failure duration time for determining a failure state (S15). If the count value is smaller than the failure determination value CTs (S15: YES), the vehicle speed detection value Va, i.e. the larger vehicle speed value of the two, is integrated with the greatest possible time constant of integration T that does not affect the safety, and the result of the integration, $\{1/(1+TS)\}Va$, is set as the control vehicle speed value Vb (S16), thus deciding the control vehicle speed value Vb (S12). In the integration, S is a Laplace operator.

As a result, the control vehicle speed value Vb gradually increases from t0 in FIG. 5, to match the vehicle speed value V2. Then, the failure detection operation is initiated to control the operation of the electric motor M by the thus determined control vehicle speed Vb. During the time that the vehicle speed value difference $|V1-V2|$ is greater than the first vehicle speed set value $\Delta Vs1$, the count value of the counter 2a continues to increment.

On the other hand, if the situation was not the case of a wire breakage in the first vehicle speed sensor SS1, but the vehicle speed value V1 just temporarily dropped and was then restored to the normal level, the decision is that the vehicle speed value difference $|V1-V2|$ is smaller than the first vehicle speed set value $\Delta Vs1$ (S8: YES), and the process proceeds to S9 where the failure detection flag is tested to see if the flag is set by the microcomputer 2. When the flag is set (S9: YES), it is checked whether the vehicle speed value difference $|V1-V2|$ is smaller than a second vehicle speed set value $\Delta Vs2$ which is smaller than the first vehicle speed set value $\Delta Vs1$ (S17).

If the vehicle speed value difference is smaller than $\Delta Vs2$ (S17: YES), that is, if the vehicle speed value V1 of the first vehicle speed sensor SS1 is restored to the normal level, the first and second vehicle speed sensors SS1 and SS2 both giving normal vehicle speed values V1 and V2, then the count value of the counter 2a is cleared (S18); the situation is determined as a temporary faulty action and the failure detection operation is thus halted. Then, the vehicle speed detection value Va, i.e. the larger vehicle speed value of the two, is integrated, and the result of the integration, $\{1/(1+TS)\}Va$, is set as the control vehicle speed value Vb (S19).

Next, it is determined if the difference between the control speed value Vb and the vehicle speed value V1 of the first vehicle speed sensor SS1 is smaller than the second vehicle speed set value $\Delta Vs2$ (S20): if the difference is smaller than the second vehicle speed set value $\Delta Vs2$ (S20: YES), the failure detection flag is cleared (S21), and the control vehicle speed value Vb is thus decided (S12).

That is, when the vehicle speed value V1 is restored to the normal level before the count value reaches the failure determination value CTs shown in FIG. 5 by which to determine the failure state, the vehicle speed value V1 is again selected as the control vehicle speed value Vb. On the other hand, if it is determined that the difference |Vb−V1|, i.e. the difference between the control vehicle speed value Vb and the vehicle speed value V1, is greater than the second vehicle speed set value ΔVs2 (S20: NO), the vehicle speed detection value Va is integrated, and the failure detection operation is continued, without clearing the failure detection flag.

If the vehicle speed value difference |V1−V2|, i.e. the difference between the vehicle speed values V1 and V2, is greater than the second vehicle speed set value ΔVs2 (S17: NO), it is determined that the vehicle speed value V1 of the first vehicle speed sensor SS1 is still abnormal, and the count value of the counter 2a is incremented (S14). As long as the count value of the counter 2a is short of the failure determination value CTs, the speed detection value Va is integrated (S16), and the result is set as the control vehicle speed value Vb (S12), by which the operation of the electric motor M is controlled.

When the failure detection operation is further continued and the incremented count value of the counter 2a reaches the failure determination value CTs (S15: NO), it is determined that the vehicle speed sensor is in a faulty condition, and the vehicle speed detection value Va is set at a predetermined vehicle speed value Vf that does not affect the safety (S22). Then, the vehicle speed detection value Va is integrated as $\{1/(1+TS)\}Va$ (S23), the failure determination flag is set to determine the failure of the vehicle speed sensor (S24), and the control vehicle speed value Vb is decided accordingly (S12) by which the operation of the electric motor M is controlled.

That is, at the count end point t1 of the failure determination value CTs, as shown in FIG. 5, the predetermined vehicle speed value Vf is given to the control vehicle speed value Va, which is then integrated; as a result, the control vehicle speed value Vb gradually increases and is held at the vehicle speed value Vf that does not affect the safety. Therefore, when the vehicle speed sensor has failed, the electric motor M is disabled from operating according to the vehicle speed so that the electric motor M is controlled in a safe-side state where no assistance is provided to the steering force. In an alternative construction, the operation of the electric motor M may be disabled without setting the control vehicle speed value Vb at the prescribed vehicle speed value Vf.

Figure 6:
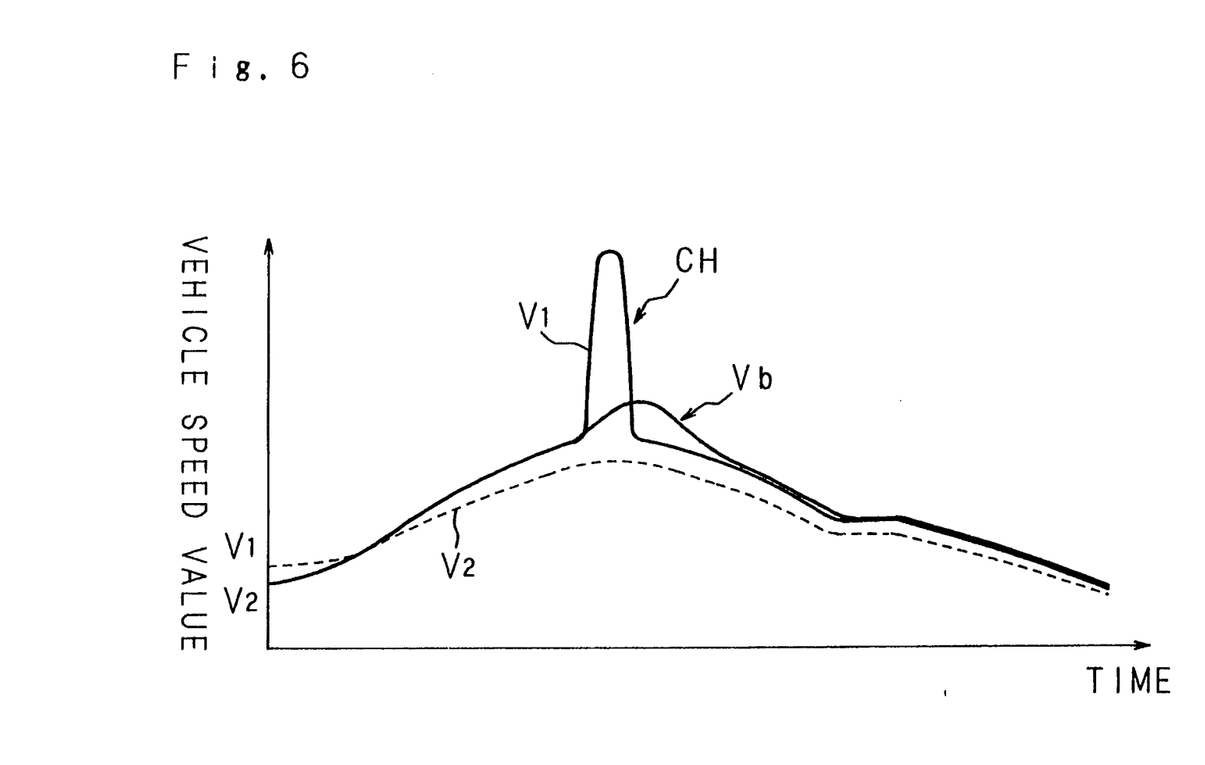
FIG. 6 is a graph showing the relationship between sensor output and control vehicle speed value when chattering has occurred in the vehicle speed sensor output.

Also, as shown in FIG. 6, when chattering CH has occurred in the vehicle speed value V1 of the first vehicle speed sensor SS1, the vehicle speed value difference |V1−V2|, i.e. the difference between the vehicle speed value V1 of the first vehicle speed sensor SS1 and the vehicle speed value V2 of the second vehicle speed sensor SS2, temporarily increases. In this case, if the microcomputer 2 determines that the difference is greater than the first vehicle speed set value Δs1 (S8: NO), then the failure detection flag is set (S13), the count value of the counter 2a is incremented (S14), and unless the count value is equal to or greater then the failure determination value CTs (S15: YES), the vehicle speed detection value Va, i.e. the greater vehicle speed value, is integrated (S16).

As a result, the control vehicle speed value Vb increases gently, as shown in FIG. 6, and decreases as the chattering CH disappears. When the microcomputer 2 has determined that the vehicle speed value difference |V1−V2| is smaller than the first vehicle speed set value ΔVs1 (S8: YES) and also that the difference is smaller than the second vehicle speed set value ΔVs2 (S17: YES), the count value of the counter 2a is cleared (S18), and the vehicle speed detection value Va is integrated (S19). As a result, the control vehicle speed value Vb is brought closer to the vehicle speed value V1.

In this manner, the control vehicle speed value Vb is prevented from changing abruptly even if the vehicle speed value V1 of the first vehicle speed sensor SS1 temporarily increases; the operation of the electric motor M is thus controlled without affecting the safety.

As described, when the vehicle speed value difference |V1−V2|, i.e. the difference between the vehicle speed values V1 and V2 of the vehicle speed sensors SS1 and SS2, becomes greater than the predetermined value, the vehicle speed detection value Va is integrated with the greatest possible constant of integration that does not affect the safety, and the result of the integration is set as the control vehicle speed value Vb. Therefore, if one or other of the vehicle speed sensors has failed, the control vehicle speed value Vb is made to gradually increase by using the greater sensor output of the two, so that the operation of the electric motor M is controlled without affecting the safety.

When the vehicle speed value of the vehicle speed sensor concerned returns to the normal level, the control vehicle speed value Vb also returns to the normal level; the utilization rate of the electric motor M to assist the steering force is thus prevented from dropping. Furthermore, if there occurs an abrupt change in the detected vehicle speed value, since the control vehicle speed value Vb is made to vary gradually, the steering safety is maintained.

Next, we will describe a backup check operation when a vehicle sensor failure state is stored in memory. Here, it is assumed that the timeup situation has occurred (S1: YES) and also that the failure determination flag is set (S2: YES); a backup flag is then tested to see if the flag is set to indicate that a vehicle sensor failure state is stored in the backup memory 8 (S25).

When the flag is set (S25: YES), first the vehicle speed value V1 of the first vehicle speed sensor SS1 is read (S26), and then the vehicle speed value V2 of the second vehicle speed sensor SS2 is read (S27). After that, it is determined if the vehicle speed value V1 is greater than a vehicle speed threshold value Vs (S28); if it is greater than the vehicle speed threshold value Vs (S28: YES), then it is determined if the vehicle speed value V2 is greater than the vehicle speed threshold value Vs (S29). If the vehicle speed value V2 is greater than the vehicle speed threshold value Vs (S29: YES), the vehicle speed value difference |V1−V2| is compared with the second vehicle speed set value ΔVs2 (S30); if the vehicle speed value difference |V1−V2| is smaller than the second vehicle speed set value ΔVs2 (S30: YES), then it is determined that the vehicle speed sensors SS1 and SS2 are both working properly, and the backup flag is cleared (S31). After that, the failure determination flag is cleared (S32), and the failure detection flag is set (S33).

Next, a comparison is made between the vehicle speed values V1 and V2 (S34); if the vehicle speed value V1 is greater than the vehicle speed value V2, the vehicle speed value V1 is selected as the vehicle speed detection value Va (S35), and if the vehicle speed value V2 is greater than the vehicle speed value V1, the vehicle speed value V2 is selected as the vehicle speed detection value Va (S36). Then, the vehicle speed detection value Va is integrated (S19), and the integrated result is set as the control vehicle speed value Vb. If the difference between the control vehicle speed value Vb and the vehicle speed value V1 is smaller than the second vehicle speed set value ΔVs2 (S20: YES), the failure detection flag is cleared (S21) to halt the failure detection operation. On the other hand, if the difference is greater than the second vehicle speed set value ΔVs2 (S20: NO), the failure detection operation is continued. The value obtained by integrating the vehicle speed detection value Va is then set as the control vehicle speed value Vb (S12) by which the operation of the electric motor M is controlled.

On the other hand, if the backup flag is not set (S25: NO), if the vehicle speed value V1 is smaller than the vehicle speed threshold value Vs (S28: NO), if the vehicle speed value V2 is smaller than the vehicle speed threshold value Vs (S29: ON), or if the vehicle speed value difference |V1−V2| is greater than the second vehicle speed set value ΔVs2 (S30: ON), then it is determined that the vehicle speed sensor SS1 or SS2 is in a faulty condition, whereupon the vehicle speed detection value Va is set at the predetermined vehicle speed value Vf (S22), the thus set vehicle speed detection value Va is integrated (S23), the failure determination flag is set (S24), and the control vehicle speed value Vb is gradually increased and held at the predetermined vehicle speed value Vf, so that the electric motor M is disabled from operating according to the vehicle speed.

Figure 4:
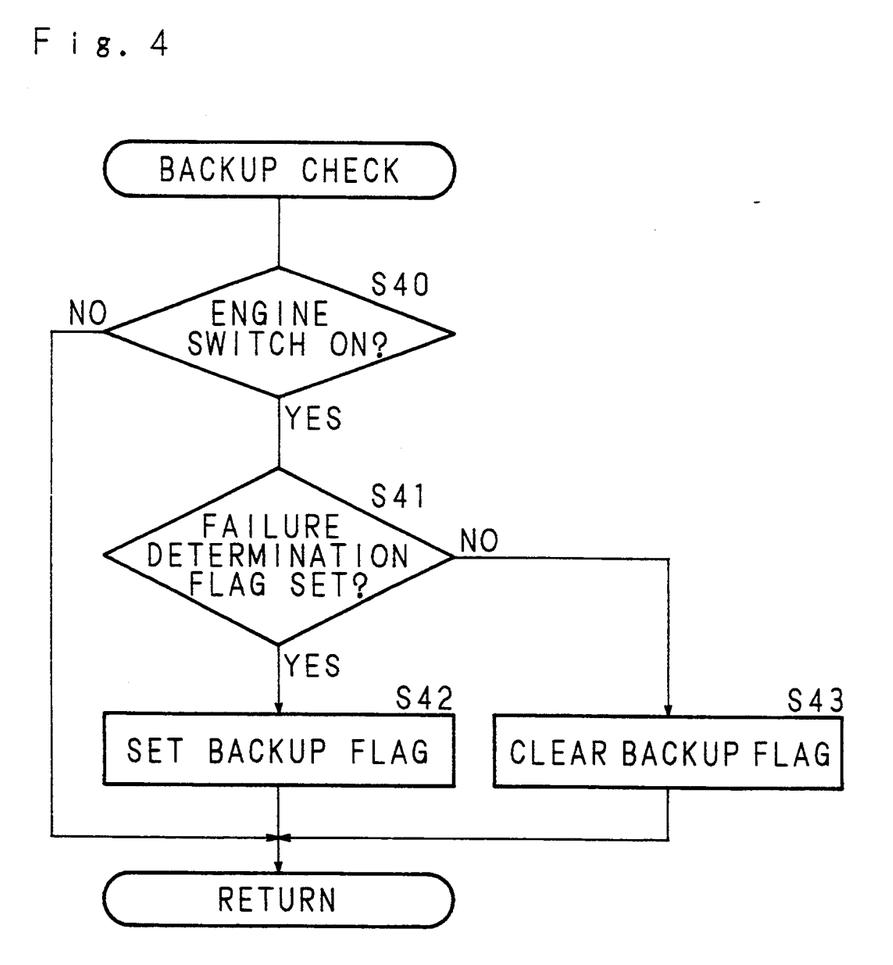
FIG. 4 is a flowchart illustrating the steps of a backup check routine.

Referring now to the flowchart of FIG. 4, we will describe the operation when restarting the engine after stopping.

When the engine ignition switch is turned on, the switch SW interlocked with it is turned on. The microcomputer 2 determines if the engine ignition switch has been turned on or not (S40), the microcomputer 2 being put in a state waiting for the engine ignition switch to be turned on. If it is determined that the engine ignition switch has been turned on (S40: YES), then the failure determination flag is tested to see if the flag is set or not (S41).

When the failure determination flag is set because one or other of the vehicle speed sensors SS1 or SS2 had failed before the engine ignition switch was turned on (S41: YES), then the backup flag is set (S42), and the process proceeds to S26. When the vehicle speed sensor SS1 or SS2 is in a faulty condition, if the vehicle speed value V1 or V2 is smaller than the vehicle speed threshold value Vs (S28, S29: NO) or if the vehicle speed value difference |V1−V2| is greater than the second vehicle speed set value ΔVs2 (S30: NO), the vehicle speed detection value Va is set at the predetermined vehicle speed value Vf, disabling the electric motor M from operating according to the vehicle speed.

That is, when the engine was stopped with the vehicle speed sensor SS1 or SS2 in a faulty condition and then restarted, the vehicle speed detection value Va is set at the predetermined vehicle speed value Vf that does not affect the safety, thereby ensure the steering safety during high speed travelling.

On the other hand, when the failure determination flag is not set (S41: NO), and therefore the backup flag is cleared (S43), the process proceeds to step S3. As previously described, when neither of the vehicle speed sensors SS1 or SS2 is in a faulty condition, the vehicle speed value V1 of the first vehicle speed sensor SS1 is selected as the vehicle speed detection value Va (S10), and the vehicle speed detection value Va is set as the control vehicle speed value Vb (S11), thus deciding the control vehicle speed value Vb (S12) by which the operation of the electric motor M is controlled.

If the vehicle speed value difference |V1−V2| is greater than the first vehicle speed set value ΔVs1 (S8: NO), the failure detection flag is set (S13), and the failure detection operation is continued.

During the failure detection operation, if it is determined that the vehicle speed value difference |V1−V2| has become smaller than the second vehicle speed set value ΔVs2 (S17: YES) and also that the difference between the control vehicle speed value Vb and the vehicle speed value V1 has become smaller than the second vehicle speed set value ΔVs2 (S20: YES), then the failure detection flag is cleared (S21), and the failure detection operation is halted. On the other hand, after the failure detection flag is set (S13), if it is determined that the count value of the counter 2a has reached the failure determination value CTs (S15: NO), the predetermined vehicle speed value Vf is set as the vehicle speed detection value Va (S22), the vehicle speed detection value Va is integrated (S23), the failure determination flag is set (S24), and the control vehicle speed value Vb is gradually increased and held at the predetermined vehicle speed value Vf, so that the electric motor M is disabled from operating according to the vehicle speed.

Therefore, when neither of the vehicle speed sensors SS1 or SS2 is in a faulty condition, the operation of the electric motor M is controlled in the same manner as before the engine was stopped.

In this embodiment, the electric motor M is used as the actuator to assist the steering force, but it will be appreciated that the same advantages can be obtained if a hydraulic cylinder is used instead of the electric motor M.

As described above, according to the present invention, when one or other of the vehicle speed sensors has failed or when chattering has occurred in the vehicle speed value detected by the vehicle speed sensor, leading to erroneous detection of the vehicle speed value, the operation of the actuator (electric motor) can be controlled upon the termination of the erroneous detection; thus, the utilization rate of the actuator that assists the steering force is prevented from dropping, and the operation of the actuator can be controlled appropriately. Furthermore, since the control vehicle speed value is made to vary gradually if there occurs an abrupt change in the vehicle speed value detected by the vehicle speed sensor, the present invention offers excellent advantages such as the maintenance of the steering safety during high speed travelling.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power steering apparatus for a vehicle, comprising:
    a torque sensor for detecting steering force;
    an actuator for assisting the steering force according to the torque detected by said torque sensor;

a first vehicle speed sensor for detecting a vehicle speed value;

a second vehicle speed sensor for detecting a vehicle speed value; and control means for controlling said actuator according to the vehicle speed values detected by said first and second vehicle speed sensors;

said control means including:

means for comparing the vehicle speed value detected by said first vehicle speed sensor with the vehicle speed value detected by said second vehicle speed sensor;

means for detecting the difference in magnitude between the two vehicle speed values detected by said first and second vehicle speed sensors; and means for integrating the detected vehicle speed value of larger magnitude to produce a control vehicle speed value for control of said actuator when said detected difference is greater than a predetermined value.

2. A power steering apparatus as set forth in claim 1, wherein said control means further includes means for setting the vehicle speed value detected by said first vehicle speed sensor as the control vehicle speed value when the detected difference between the two detected vehicle speed values becomes smaller than a first predetermined value within a predetermined time and when the difference between the control vehicle speed value and the vehicle speed value detected by said first vehicle speed sensor becomes smaller than a second predetermined value which is smaller than said first predetermined value.

3. A power steering apparatus as set forth in claim 1, wherein said control means further includes means for setting a predetermined vehicle speed value as the control vehicle speed value when the detected difference between the two detected vehicle speed values is greater than the predetermined time.

4. A power steering apparatus as set forth in claim 3, wherein said control means further includes means for varying the control vehicle speed value on the basis of the predetermined vehicle speed value and a predetermined time constant.

5. A power steering apparatus as set forth in claim 1, wherein said control means further includes means for disabling the operation of said actuator when the difference between the two detected vehicle speed values is greater than the predetermined value and remains in that state for more than a predetermined duration of time.

6. A power steering apparatus as set forth in claim 1, wherein said actuator is an electric motor.

* * * * *